(12) United States Patent
Bhakta et al.

(10) Patent No.: US 7,495,631 B2
(45) Date of Patent: Feb. 24, 2009

(54) METHOD, APPARATUS AND COMPUTER PROGRAM PRODUCT FOR DYNAMIC DISPLAY OF BILLBOARD INFORMATION

(75) Inventors: Dharmesh N. Bhakta, Austin, TX (US); Walter Chun-Won Lee, Cedar Park, TX (US); Kumar Ravi, Cedar Park, TX (US); Eric Siegfried Rybczynski, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 11/103,739

(22) Filed: Apr. 12, 2005

(65) Prior Publication Data

US 2006/0229939 A1    Oct. 12, 2006

(51) Int. Cl.
    *G09G 5/00* (2006.01)
(52) U.S. Cl. .......................................... 345/1.1; 345/1.2
(58) Field of Classification Search .................. 345/1.1, 345/1.2, 7, 8, 1.3, 3.1, 3.3, 552, 565, 632, 345/748; 340/425, 928; 455/557; 379/88.16
    See application file for complete search history.

(56) References Cited

U.S. PATENT DOCUMENTS

| | | | |
|---|---|---|---|
| 4,739,567 A | 4/1988 | Cardin | |
| 5,150,116 A | 9/1992 | West | |
| 5,510,828 A | 4/1996 | Lutterbach | |
| 6,191,825 B1 | 2/2001 | Sprogis | |
| 6,731,940 B1 | 5/2004 | Nagendran | |
| 7,154,383 B2* | 12/2006 | Berquist | 340/425.5 |
| 2003/0001796 A1 | 1/2003 | Wampler | |
| 2003/0233275 A1 | 12/2003 | Melvin | |
| 2004/0155797 A1* | 8/2004 | Arai | 340/928 |
| 2005/0190895 A1* | 9/2005 | Ploof et al. | 379/88.16 |
| 2006/0035669 A1* | 2/2006 | Chuprun et al. | 455/557 |

OTHER PUBLICATIONS

SiliconView Electronic Billboard web site, http://www.siliconview.com/about.htm.

* cited by examiner

*Primary Examiner*—Nitin Patel
(74) *Attorney, Agent, or Firm*—Anthony V S England; Diana R. Gerhardt (57) ABSTRACT

Display time for a billboard message is varied in proportion to measured speed of one or more vehicles. This may include varying not only the time a message is presented on the billboard, but also varying the density of the message. An overall message may be broken into segments displayed a sequence of billboards depending on the speed, e.g., for a faster moving vehicle the message has more segments. If the speed of a vehicle is great enough, the message segments are also reduced to fewer words or graphics, which may also be larger. Also, clusters of vehicles are detected and a billboard message display is varied in response to the clusters, which may include display time or segmentation variation, so as to more nearly optimize the number of persons who are able to see the message. Further, a billboard is rotated per vehicle speed, distance, length or clusters.

8 Claims, 5 Drawing Sheets

METHOD, APPARATUS AND COMPUTER PROGRAM PRODUCT FOR DYNAMIC DISPLAY OF BILLBOARD INFORMATION

BACKGROUND OF THE INVENTION

1. Field of the Invention

The present invention relates to billboard, and, more particularly, dynamically-controlled display of information on billboards.

2. Related Art

Billboards are a widely used way to present advertising, public service announcements and the like. One of the most common types of billboards is a large board mounted high alongside a road and having a printed advertisement pasted to the surface of the board. Limitations of this relatively static arrangement have led to many improvements over the years. For example, U.S. Pat. No. 5,510,828, granted to Lutterbach , et al., Apr. 23, 1996, describes a system in which the conventional board that posts printed material is replaced by a large-screen video display system.

A number of improvements for billboards have been suggested that relate to customized information display depending on traffic situations. U.S. Pat. No. 5,150,116, granted to West, Sep. 22, 1992, describes positioning an advertising display device next to a traffic control signal and coordinating the display device with the traffic control signal to selectively make an advertising message invisible or visible to drivers depending on when the advertising message will or will not adversely distract drivers. West indicates that showing advertising during red lights and stalled traffic may decrease driver boredom and irritability, while avoiding safety issues that would be of concern if an advertising message was otherwise shown next to a traffic signal. U.S. Patent Application 20030001796 filed by Wampler, et al., published on Jan. 2, 2003, describes an advertising billboard system with a display unit that displays one message during commuter rush hours and a different message at other times.

Some of the teachings in the prior art for traffic-dependent customizing of billboard information relate more particularly to vehicle speed or location. For example, U.S. Pat. No. 6,731,940 granted to Nagendran, May 4, 200, describes a way to determine locations of mobile device users, who may be in moving vehicles, and to send customized information directly to the users or to electronic billboards near their vehicles. Nagendran further suggests that user location information can be aggregated and time sampled to determine traffic density and vehicle speed, which can also be dynamically displayed on billboards. This is presumably proposed by Nagendran as a way to notify drivers who are near a billboard some distance from the location where traffic is congested. U.S. Patent Application 20030233275, filed by Melvin, published on Dec. 18, 2003, describes a system in which vehicle-specific advertising is automatically displayed on billboards in response to characteristics of vehicles that are measured in real-time. Melvin points out that this presents an challenge for computational resources which relates to vehicle speed, because if a vehicle is approaching a billboard at high speed then processing must be fast in order to analyze the vehicle's characteristics and generate or select vehicle-specific information for the billboard message. For example, Melvin states that "allowable processing time" is only about 3.4 seconds for a vehicle traveling toward a billboard at 60 miles per hour that is sensed 100 yards before the billboard is viewable from the vehicle.

While the above references teach useful ways of displaying billboard information that is customized in some manner according to traffic conditions, vehicle characteristics, vehicle locations or vehicle speed, the need still exists for additional improvement in this field.

SUMMARY

The foregoing need is addressed in the present invention. In one form of the invention, speed of at least one vehicle is measured and display time for a billboard message is varied in proportion to the measured speed. This may include varying not only the time a message is presented on the billboard, but also may include varying the density of the message, e.g., the number of words, size of words, or the amount or size of graphical information.

In additional aspects, an overall message may be selectively broken into segments displayed on respective ones of a number of billboards, where the billboards are located such that they are viewable in a sequence for a passenger in a moving vehicle. The number of segments depends on the speed of a passing vehicle. For a slowly moving vehicle, the message is broken into fewer segments. If the vehicle is moving slowly enough, the entire message may be displayed on just one of the billboards. For a faster moving vehicle, the message is broken into more segments. If the vehicle is moving very fast, the message is broken into a number of segments corresponding to the maximum number of billboards in the sequence. If the speed of the vehicle is great enough, the message segments are also reduced to fewer words or graphics, which may also be larger.

In still further aspects, clusters of vehicles are detected and a billboard message display is varied in response to the clusters, which may include the above mentioned display time variation or segmentation variation, so as to more nearly optimize the number of persons who are able to see the message. Also, the billboard message display may be varied according to detected lengths of vehicles.

In yet another aspect, such a billboard is rotated in response to vehicle speed, distance, length or clusters.

Other variations, objects, advantages and forms of the invention will become apparent upon reading the following detailed description and upon reference to the accompanying drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment read in conjunction with the accompanying drawings.

DETAILED DESCRIPTION OF THE PREFERRED EMBODIMENT

In the following detailed description of the preferred embodiments, reference is made to the accompanying drawings illustrating embodiments in which the invention may be practiced. It should be understood that other embodiments may be utilized and changes may be made without departing from the scope of the present invention. The drawings and detailed description thereof are not intended to limit the invention to the particular form disclosed, but on the contrary, the intention is to cover all modifications, equivalents and alternatives falling within the spirit and scope of the present invention as defined by the appended claims.

Figure 1:
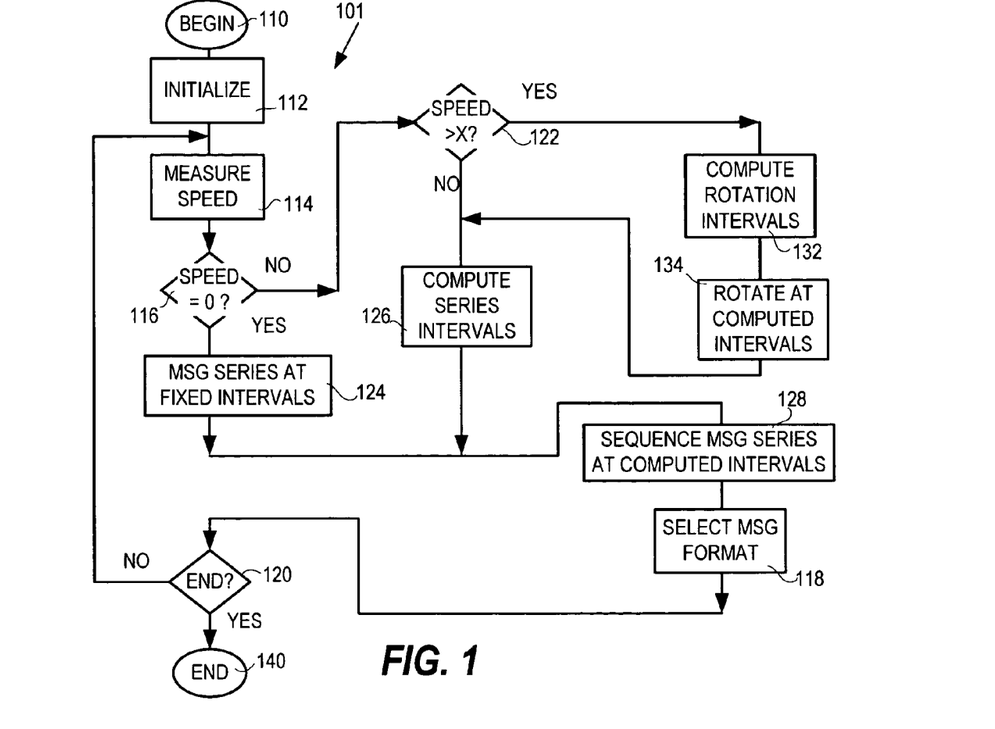
FIG. 1 shows an algorithm for dynamically controlling display of information on billboards, according to an embodiment of the present invention.

Referring now to FIG. 1, an algorithm 101 is shown for dynamically controlling display of information on billboards, according to an embodiment of the present invention. After beginning at 110, algorithm 101 is initialized at 112, which may include setting initial operation of a set of billboards, such as initial orientation and rotation speed, according to stored history and current time of day. More specifically, in one embodiment of the invention an historical table is maintained, recording instances of and speeds of passing vehicles and clusters, lengths of vehicles and clusters, and time of day and day of the week for each record.

Next, at logic block 114, speed of at least one vehicle in the vicinity of a billboard is measured. If the speed is zero miles per hour, or at least close to that, then block 116 branches to block 124, where predetermined time intervals are selected for presenting a series of messages on a billboard. That is, since traffic is at a standstill, or nearly so, a number of different advertisements may be displayed in a time series on a single billboard. The time interval for each advertisement, i.e., message, may depend on how much the advertiser has paid the billboard owner. For example, one message may be displayed for 20 seconds, another may be displayed for 45 seconds, a third may be displayed for 30 seconds, etc. As long as the traffic is at or near a standstill the series may be extended so numerous different messages are presented.

If the speed is substantially more than zero miles per hour, then block 116 branches to block 122. If, at 122, the measured speed is less than a predetermined limit X, such as 55 miles per hour, for example, billboard algorithm 101 branches to block 126, where a display time interval is computed for a message, or a number of such intervals are computed for a series of messages, in response to the measured speed. Alternatively, the display time interval or intervals may be selected from a predetermined lookup table, where the selected display time interval for a message depends on the measured speed. Regardless of whether such an interval is determined by real-time computation or by lookup table, the display time interval may decrease in response to increasing measured speed. Also, as the observed speed increases, each message may be selectively broken into an increasing number of segments for display on a sequence of billboards, as will be described further herein below.

Even if a message has been broken into a number of segments, once vehicles are moving past a billboard above some certain speed such as X, they may be moving too quickly for occupants to easily see even a single message segment on the billboard. It may help in this situation, at least for some of the vehicles, to rotate the billboard. Therefore, in response to measuring a vehicle speed equal to or more than the predetermined limit X logic 122 branches to logic blocks 132 and 134, which concern rotating a billboard in response to vehicle speeds. Logic blocks 132 and 134 and related details will be described further herein below. From logic blocks 132 and 134, algorithm 101 continues at 126.

Once time intervals are selected at block 124 or block 126, the algorithm 101 continues to block 118, where a format for a single message is selected from a lookup table in response to the measured speed. After block 118, algorithm 101 checks at logic block 120 to see if it should end at 140, i.e., to see if the billboard is to be taken out of service for some reason. If no, the algorithm 101 branches back to block 114, to continue checking the traffic speed.

Figure 2:
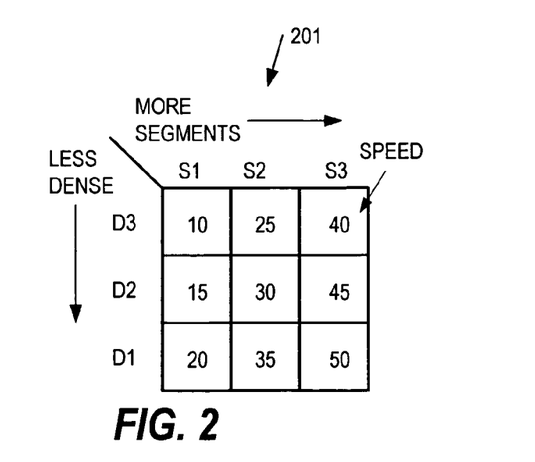
FIG. 2 shows a first lookup table used in connection with the algorithm of FIG. 1, according to an embodiment of the present invention.

Referring now to FIG. 2, a first lookup table 201 is shown, according to an embodiment of the present invention. Lookup table 201 is referenced by logic 118 in connection with algorithm 101 of FIG. 1. If the speed measured at block 114 (FIG. 1) is at least 10 miles per hour and less than 15 miles per hour, then cell (S1, D3) is indicated by table 201. S1 signifies that the selected message format has only one message segment and a density of 3, on a scale of 1 to 3, 1 being the least dense and 3 being the most dense. Message "density," as it is used in this context in the present patent application, refers to characteristics of the message such as the size of the font of words in the segment(s) of the message, the number of words in the segment(s), the length of the words (i.e., number of letters in the words), the amount and size of graphics, etc. If the speed measured at block 114 (FIG. 1) is at least 15 miles per hour and less than 20 miles per hour, then cell (S1, D2) is indicated, which signifies that the selected message format again has only one message segment, but in this instance has a density of 2.

Figure 3:
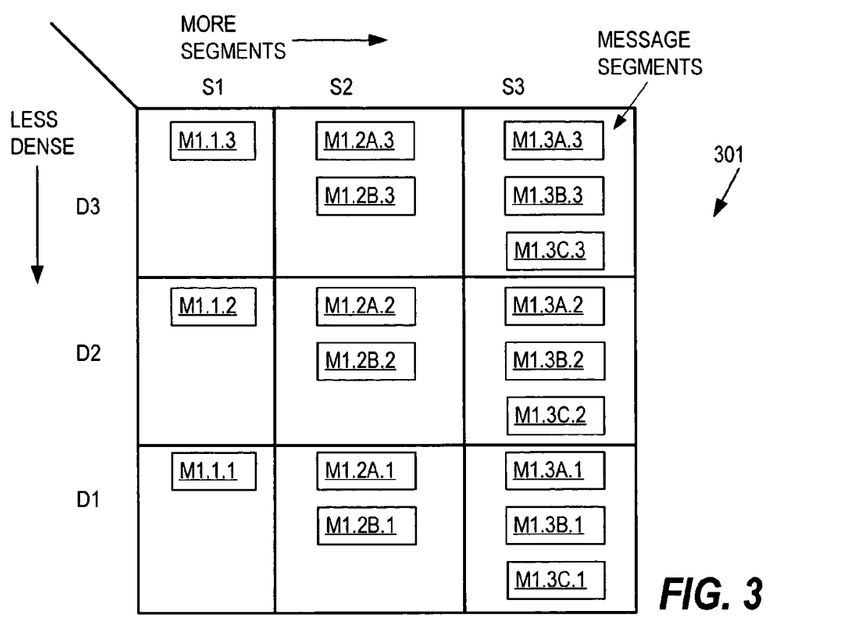
FIG. 3 shows a second lookup table used in connection with the algorithm of FIG. 1, according to an embodiment of the present invention.

Referring now to FIG. 3, a second lookup table 301 is shown, according to an embodiment of the present invention. Lookup table 301 is used in connection with algorithm 101 of FIG. 1 and lookup table 201 of FIG. 2. As explained above, the measured speed determines which cell of table 201 is selected. In turn, the indicated cell of 201 is referenced in table 301, as a way of selecting particular message formats. For example, if the speed measured at 114 (FIG. 1) is at least 25 miles per hour and less than 30 miles per hour, so that cell (S2, D3) is selected in table 201, then the message format indicated in cell (S2, D3), of table 3 has two message segments, M1.2A.3 and M1.2B.3.

Figure 4A:
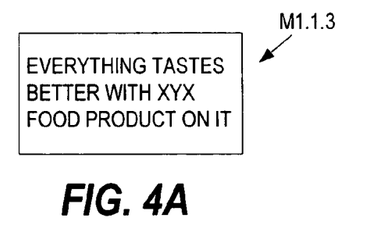
FIGS. 4A-4F show various formats for a billboard message, including formats in which the message is broken into segments for a sequence of billboards, according to an embodiment of the present invention.
Figure 4B:
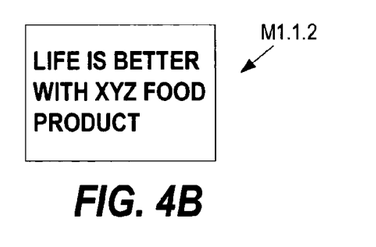
Figure 4C:
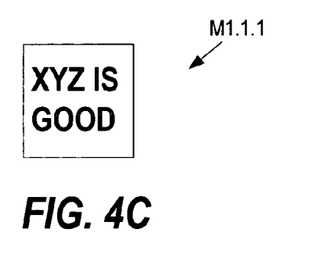

Referring now to FIGS. 4A-4F, various formats are shown for a billboard message, including formats in which the message is selectively broken into segments for a sequence of billboards, according to an embodiment of the present invention. FIG. 4A illustrates an exemplary message format M1.1.3 selected from cell (S1, D3) of table 301, which has content and format as shown for a single segment and highest density. FIG. 4B illustrates an exemplary message format M1.1.2 selected from cell (S1, D2) of table 301, which has content and format as shown for a single segment and medium density (i.e., less dense than the highest density message format M1.1.3). Note that message format M1.1.2 achieves decreased density by having fewer words with a larger font than message format M1.1.3. FIG. 4C illustrates an exemplary message format M1.1.1 selected from cell (S1, D1) of table 301, which has content and format as shown for a single segment and lowest density (i.e., even less dense than the medium density message format M1.1.2). Message format M1.1.1 achieves decreased density by having still fewer words and a still larger font than message format M1.1.2. In the examples, message M1.1.3 has 9 words, with an average of 4.9 letters per word; message M1.1.2 has 7 words, with an average of 4.3 letters per word; and message M1.1.1 has 3 words, with an average of 3 letters per word.

Figure 4D:
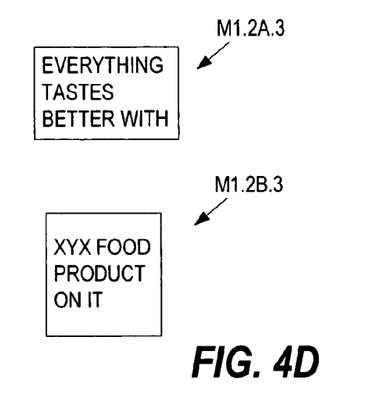
Figure 4E:
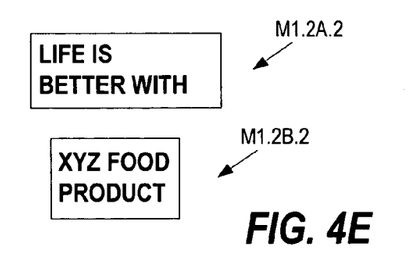
Figure 4F:
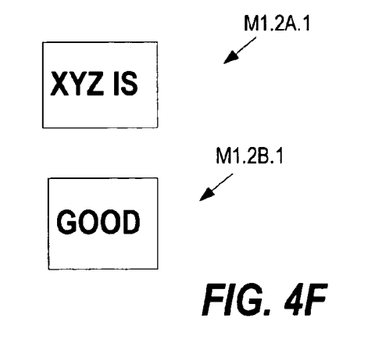

FIG. 4D illustrates an exemplary message format selected from cell (S2, D3) of table 301, which has two segments, M1.2A.3 and M1.2B.3, with content and format as shown for highest density. FIG. 4E illustrates an exemplary message format selected from cell (S2, D2) of table 301, which has two segments, M1.2A.2 and M1.2B.2, with content and format as shown for medium density. FIG. 4F illustrates an exemplary message format selected from cell (S2, D1) of table 301, which has two segments, M1.2A.1 and M1.2B.1, with content and format as shown for least density.

Figure 5A:
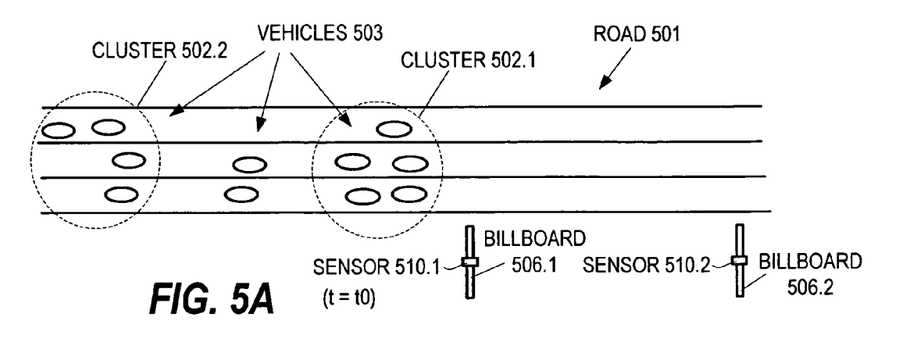
FIGS. 5A-5C show a sequence of times for a road with clusters of traveling vehicles in view of roadside billboards, according to an embodiment of the present invention.
Figure 5B:
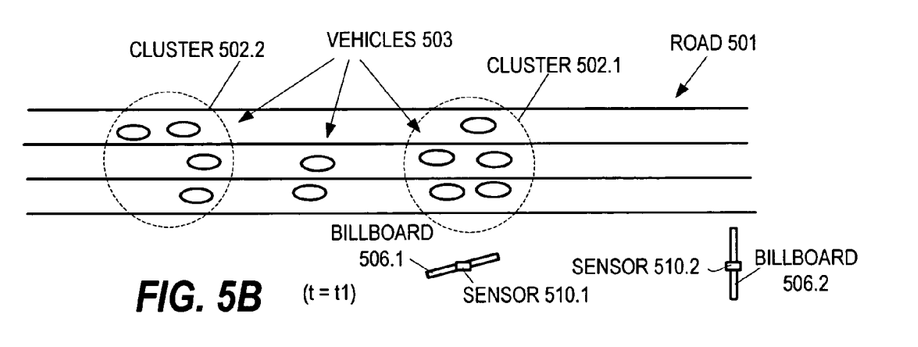
Figure 5C:
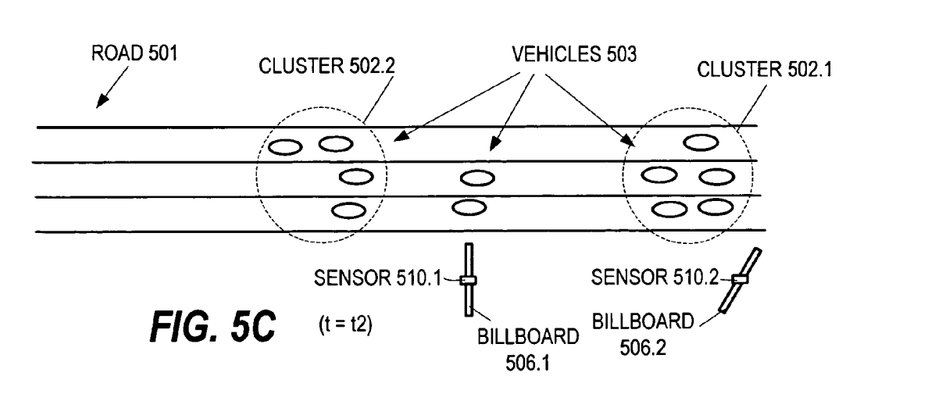

Referring now to FIGS. 5A-5C, a road 501 with clusters 502.1 and 502.2 of traveling vehicles 503 in view of roadside billboards 506.1 and 506.2 is shown for a sequence of times, t=t0, t=t1 and t=t2, according to an embodiment of the present invention. (As the term is used in the present application, a "cluster" refers to a group of at least two vehicles that are closer to one another than other vehicles in the vicinity.) As time progresses, from t0 in FIG. 5a, to t1 in FIG. 5B, to t2 in FIG. 5C, the vehicle clusters 502.1 and 502.2 travel from left to right on road 501.

As shown in FIGS. 5A-5C, a sensor 510.1 is mounted on billboard 506.1. Likewise, a sensor 510.2 is mounted on billboard 506.2. Sensors 510.1 and 510.2 are operable to measure the speed of at least one of the vehicles 503 or clusters 502.1 and 502.2, and each sensor 510.1 and 510.2 may actually include a number of individual sensors (not shown) for measuring the speed of respective ones of the vehicles 503 or of the vehicle clusters 502.1 and 502.2.

With reference now to FIGS. 5A-5C together with FIG. 1, sensors 510.1 and 510.2 may provide the measured speed input for logic 114 (FIG. 1), which is used as described herein above. As mentioned above, in one embodiment algorithm 101 has logic 130-134, as shown in FIG. 1, which is used to rotate billboards 506.1 and 506.2 as shown in FIGS. 5A-5C. That is, if logic block 122 determines the measured speed exceeds some predetermined value X, then at 132 rotation timing is computed based on the measured speed. Alternatively, the rotation and resting time intervals may be selected from a predetermined set of intervals in a lookup table. (As used in the present application, the term "rotation time interval" refers to the time interval during which a billboard rotates through some predetermined amount of rotation (thus corresponding to a rotational speed) and the term "resting time interval" refers to the time interval during which the billboard is returning to or remains in a fixed position, such as the zero degree rotation position.) Then the billboards 506.1 and 506.2 are rotated as governed by logic 134 according to their respectively selected timing intervals. The timing intervals are selected, in one embodiment, so that the messages on the billboards 506.1 and 506.2 rotate in synchrony with the measured speed of at least one or more of the vehicles 503. Thus, the messages on the billboards 506.1 and 506.2 may be observable for longer from within the particular moving vehicle or vehicles 503 to which the rotations are synchronized.

Figure 6:
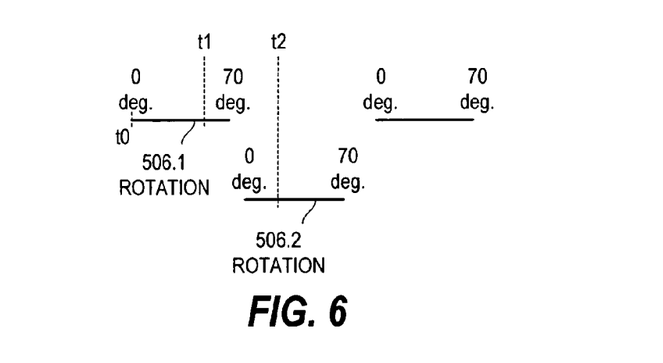
FIG. 6 shows further details of the selective rotation of billboards, according to an embodiment of the present invention.

Referring now to FIG. 6 together with FIGS. 5A-5C, further details of the selective rotation of billboards 506.1 and 506.2 are illustrated, according to an embodiment of the present invention. At time t0, as shown in FIG. 5A and FIG. 6, both billboards 506.1 and 506.2 have 0 degrees rotation, i.e., they are both facing essentially perpendicular to the road 501. At time t1, as shown in FIG. 5B and FIG. 6, billboard 506.1 is in its rotation interval and is rotated about 55 degrees, while billboard 506.2 is still in its resting time interval and is therefore still at 0 degrees rotation. At time t2, as shown in FIG. 5C and FIG. 6, billboard 506.1 has finished its rotation interval, i.e., is in another resting time interval, and has therefore returned back to the 0 degrees position, while billboard 506.2 has now begun its rotation interval and has rotated about 20 degrees.

As previously pointed out, the messages on the billboards 506.1 and 506.2 may be observable for longer from within particular moving vehicle or vehicles 503 if the rotations and the vehicles 503 are synchronized. For example, note that in FIG. 5B billboard 506.1 has rotated in synchrony with a cluster 502.1, so that it the message on the billboard 506.1 is visible for longer to the occupants of vehicles 503 in cluster 502.1. In FIG. 5C, i.e., at time t=t2, billboard 506.1 has returned to its resting position. Note that in the process of rotating back to its resting position, billboard 506.1 has swept past the vehicles 503 that are just behind cluster 502.1, unfortunately reducing the overall time of visibility of billboard 506.1 for them. This situation is accidentally mitigated in this instance because there just happens to be another cluster 502.2 of vehicles 503 which are advantageously positioned so that the billboard 506.1 increases its visibility to them when the billboard 506.1 returns to rest at time t2. Note also, that even with respect to the clusters 502.1 and 502.2, the visibility of the rotating billboards 506.1 and 506.2 depends on not only the speed of the vehicles 503 in the clusters 502.1 and 502.2 and the speed of rotation of the billboards 506.1 and 506.2, but also on the locations of the clusters 502.1 and 502.2 in relation to the rotations.

The situation depicted in FIGS. 5A-5C introduces a cluster-response feature of the present invention, that is, a feature in which rotation is deliberately coordinated to match clusters of vehicles, insofar as possible. That is, according to the cluster-response feature, the situation depicted in FIGS. 5A-5C is deliberate instead of accidental, so that rotations of billboard 506.1 improve visibility time for a more nearly maximum number of vehicles 503, i.e., clusters 502.1 and 502.2, and reduce visibility time for a more nearly minimum number of vehicles 503, i.e., the vehicles in between clusters 502.1 and 502.2. Specifically, for the cluster-response feature, sensor 510.1 (FIGS. 5A-5C) detects presence of and measures distance and speed of the clusters 502.1 and 502.2 and provides this information to logic 132 (FIG. 1), which computes (or looks up) rotation time intervals, resting time intervals, and start times therefore, for rotation of billboard 506.1 such that the rotations tend to keep the billboard 506.1 facing cluster 502.1 and then cluster 502.2. Note that if cluster 502.2 follows cluster 502.1 closely or has a higher speed the resting time interval may be 0 seconds, or even less. That is, a first rotation that tracks cluster 502.1 may even be cut short of its full range in order to position the billboard 506.1 toward cluster 502.2, and a second rotation, which tracks cluster 502.2, may before the billboard 506.1 even returns fully to its normal resting position.

Figure 7:
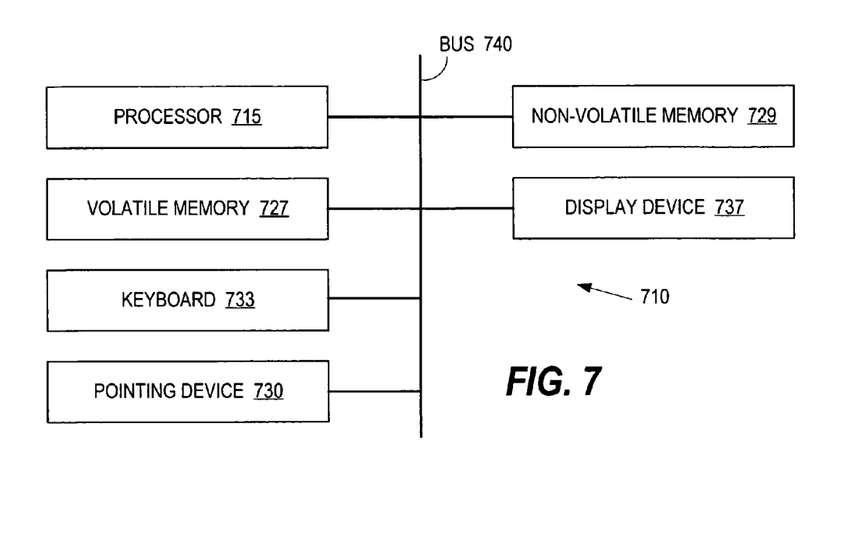
FIG. 7 shows a computer system suitable for dynamically-controlling display of information on billboards, according to an embodiment of the present invention.

Referring to FIG. 7, a block diagram is shown illustrating a computer system 710 suitable for dynamically-controlling display of information on billboards, according to an embodiment of the present invention. That is, system 710 is suitable for use as a controller to execute algorithm 101 (FIG. 1), for example. In various embodiments, system 710 takes a variety of forms, including a controller, personal computer system, mainframe computer system, workstation, server, etc. That is, it should be understood that the term "computer system" is intended to encompass any device having a processor that executes instructions from a memory medium.

System 710 includes a processor 715, a volatile memory 727, e.g., RAM, a keyboard 733, a pointing device 730, e.g., a mouse, a nonvolatile memory 729, e.g., ROM, hard disk, floppy disk, CD-ROM, and DVD, and a display device 737 having a display screen. Memory 727 and 729 are for storing program instructions (also known as a "software program"), which are executable by processor 715, to implement various embodiments of a method in accordance with the present invention. In various embodiments the one or more software programs are implemented in various ways, including procedure-based techniques, component-based techniques, and/or object-oriented techniques, among others. Specific examples include XML, C, C++ objects, Java and commercial class libraries. Components included in system 710 are interconnected by bus 740. A communications device (not shown) may also be connected to bus 740 to enable information exchange between system 710 and other devices.

Those of ordinary skill in the art will appreciate that the hardware in FIG. 7 may vary depending on the implementation. For example, other peripheral devices, such as optical disk drives and the like, may be used in addition to or in place of the hardware depicted in FIG. 7. The depicted example is not meant to imply architectural limitations with respect to the present invention. For example, the processes of the present invention may be applied to multiprocessor data processing systems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, DVD-ROMs and transmission-type media such as digital and analog communications links. Also, the algorithm 101 (FIG. 1) may be performed, in at least some aspects, by application specific hardware in addition to, or instead of, the more general purpose computer system 710 depicted in FIG. 7.

Figure 8:
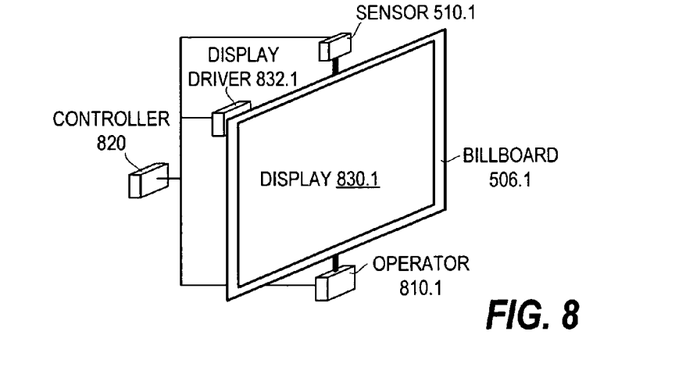
FIG. 8 shows details of control apparatus for a billboard, according to an embodiment of the present invention.

Referring now to FIG. 8, details of control apparatus are illustrated for billboard 506.1, according to an embodiment of the present invention. The control apparatus includes the previously mentioned sensor 510.1, together with an operator 810.1 for rotating the billboard 506.1 and a controller 820 for communicating with the operator 810.1 to control the billboard rotation and also for communicating with a display driver 832.1 for controlling display of messages on a display 830.1 of the billboard, such as according to the algorithm depicted in FIG. 1, for example. (It should be understood that according to the embodiment depicted each of the billboards of FIGS. 5A-5C has an operator like operator 810.1 shown in FIG. 8 for billboard 506.1. In one embodiment of the invention, control of all the billboards of FIGS. 5A-5C is done by controller 820. In an alternative, control of the billboards is distributed among a number of such controllers.) According to one embodiment of the present invention, controller 820 includes a computer system such as system 710 (FIG. 7).

Vehicle speed measurement is well-known using a radar source, radar echo sensor, timer and computer. Alternatively, it is well-known to use a timer, computer and sensors that detect a vehicle passing two spots in order to determine speed. Passing the spots can be detected by light beams and light sensors, radar, pneumatic lines stretched across the road and attached to pressure sensors, or by magnetic induction detectors.

Clusters are more than a certain number of vehicles within a predetermined region of the road adjacent to the billboards, such as may be determined by radar, low power lasers, magnetic induction detectors, or even radio frequency detection of identifiers issued to drivers or vehicles, such as for cell phones or frequent toll road travelers. Alternatively, clusters are detected responsive to more than a certain number of vehicles passing a spot on the road within a predetermined, short time interval. The time interval may be adjusted depending upon the vehicle speeds.

Vehicle lengths may be detected also by a radar source, radar echo sensor, timer and computer, possibly combined with a predetermined signature, i.e., known pattern of the reflected radar signal, that depends on vehicle length. Alternatively, vehicle length is detected in response to the time for a vehicle to pass a first spot (using a simple light beam and optical sensor, pneumatic line and pressure sensor, radar, magnetic induction detector, etc.) and the time for the vehicle to pass a second spot on the road, which is a known distance from the first spot on the road. The time from the vehicle first interrupting the optical beam (or first causing a pressure event on the first pneumatic line, etc.) until the vehicle first first interrupts the second beam (or first causes a pressure event on the second pneumatic line, etc.) indicates the vehicle speed. Given the vehicle speed thus determined by the two light beams (or pneumatic lines, etc.), the time duration during which one of the light beams was interrupted by the vehicle (or the time duration between pressure events caused by the vehicle compressing one of the pneumatic lines, etc.) indicates the vehicle length.

In one embodiment of the present invention, displaying the billboard message includes starting the message displaying at a certain start time, the message start time being selected in response to the measured speed of the clusters. Also, selecting the message start time may include selecting the message start time to correspond to a time when one of the clusters arrives at a distance from which the message for the billboard is readable, and selecting the message display time duration may include selecting the message display time duration to correspond to a time interval when the one of the clusters is at a distance from which the message for the billboard is readable. Rotating the billboard by the computer is done in response to the speed of such a cluster. The rotation is about an axis substantially perpendicular to the road. The rotating responsive to the cluster speed tends to maintain a face of the billboard toward the cluster, enabling an increased number of persons to see the message from within the traveling vehicles.

The description of the present embodiment has been presented for purposes of illustration, but is not intended to be exhaustive or to limit the invention to the form disclosed. Many modifications and variations will be apparent to those of ordinary skill in the art that are within the spirit and scope of the invention. For example, various modes of operation have been presented, including a first mode in which zero speed is detected and messages are presented on a single billboard at fixed intervals, a second mode in which non-zero speed is measured and messages are presented at intervals responsive to the measured speed of one or more vehicles or clusters of vehicles, in which case the messages are presented for time intervals that tend to match the measured speed and may be presented either on a single billboard or may be segmented and presented on a series of billboards, and a third mode in which one or more clusters are detected and the billboard or billboards are rotated responsive to the speed and proximity of the one or more clusters. It should be understood that these modes may be selectively enabled or disabled, so that, for example, the billboards do not rotate but otherwise perform according to the other modes, etc.

Also, the occasions for the various modes may differ from those described for the exemplary embodiments set out herein above. For example, the description herein above of the third, cluster-response mode of operation indicated that this mode is triggered by detection of speeds exceeding some limit X, such as 55 miles per hour. However, it should be understood that this mode may be selected by other conditions or events or selected manually, i.e., operating continually regardless of measured speed.

Further, it been described herein above that the sensors for the billboards measure speed and distance of vehicles or clusters. The sensors may also measure length of the vehicles or clusters. Accordingly, the timing and segmentation of messages and of billboard rotations may also be responsive to these lengths. For example, if long vehicles, such as 18-wheeled tractor trailers are preferred targets for a message then the timing and segmentation of the messages and the rotations may be coordinated in response to the proximity and speed of such long vehicles.

Note also, the historical table, which is mentioned herein above in connection with FIG. 1, is used to regulate operation of the billboards in the event of sensor failure in an embodiment of the invention. Also, averages may be determined from the historical records and used to adjust billboard operation. That is, although algorithm 101 (FIG. 1) described herein above refers to regulating operations of the billboards in response to real-time measurements for individual vehicles or clusters, it should be understood that historical data may be used in conjunction with real-time measurements to determine the orientation, rotation and segmentation features described above. This may be particularly useful to ensure that the billboard orientation, rotation and message segmentation does not change too frequently due to vehicle speed measured in real-time.

In other alternatives, rotation and message segmentation may be controlled to change in response weather conditions, including brightness of the sun. This includes displaying messages in response to decreasing visibility due to increasing effects of snow, rain or fog in the manner described above for traffic at a higher speed. This also includes making the billboard display brighter or changing the displayed hue as a function of how nearly the billboard faces into bright sunlight or else how nearly the sun is aligned behind or beside the billboard with respect to approaching vehicles.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

What is claimed is:

1. A method for dynamically-controlled display of information on a billboard, the method comprising the steps of:
    a) displaying a billboard message, wherein the message is displayed on the billboard for a certain time duration;
    b) measuring speed of at least one vehicle by at least one sensor;
    c) selecting the message display time duration, by at least one computer, in response to the measured speed;
    selectively breaking the message into a number of segments by the computer; and
    displaying the message segments on respective ones of a number of billboards by the computer, wherein the billboards are located such that they are viewable in a sequence as the at least one vehicle moves, and wherein the number of segments is selected in response to the measured speed, such that the number of segments is increased in response to an increase in the measured speed.

2. The method of claim 1, wherein selectively breaking the message into a number of segments by the computer includes i) breaking the message into two segments for a first measured speed, wherein for the first measured speed the displaying of the message segments on respective ones of a number of billboards includes displaying a first one of the two message segments on a first one of the billboards and displaying a second one of the two message segments on a second one of the billboards, and ii) breaking the message into three segments for a second measured speed, the second measured speed being a higher speed than the first measured speed, wherein for the second measured speed the displaying of the message segments on respective ones of a number of billboards includes displaying a first one of the three message segments on a first one of the billboards, displaying a second one of the two message segments on a second one of the billboards, and displaying a third one of the three message segments on a third one of the billboards 3. The method of claim 1, including the step of:
    detecting, by at least one sensor, clusters of vehicles traveling in a certain direction on a road, wherein step b) further comprises measuring, by the sensor, speed of at least one of the clusters of vehicles, and wherein the message display time duration is selected in step c) in response to the measured speed of the clusters, enabling an increased number of persons to see the message from within the traveling vehicles.

4. The method of claim 3, including the step of:
    rotating the billboard by the computer in response to the speed of such a cluster, wherein the rotation is about an axis substantially perpendicular to the road and wherein the rotating responsive to the cluster speed tends to maintain a face of the billboard toward the cluster, enabling an increased number of persons to see the message from within the traveling vehicles.

5. The method of claim 1, including the step of:
    detecting, by the sensor, lengths of vehicles traveling in a certain direction on a road, wherein the message display time duration is selected by the computer in step c) also in response to the lengths, enabling an increased number of persons to see the message from within the traveling vehicles.

6. The method of claim 1, wherein step c) further comprises:
    selecting the message display time duration for the billboard message such that the billboard message is displayed for a shorter time duration as the measured speed increases, and for a longer time duration as the measured speed decreases.

7. A method for dynamically-controlled display of information on a billboard, the method comprising the steps of:
    a) displaying a billboard message, wherein the message is displayed on the billboard for a certain time duration;
    b) measuring speed of at least one vehicle by at least one sensor;
    c) selecting the message display time duration, by at least one computer, in response to the measured speed, wherein the message includes at least one word or includes graphical information; and changing, by the computer, the at least one word or the graphical information included in the message in response to the measured speed, wherein the message includes a certain number of words, and the changing of the at least one word or the graphical information includes changing the certain number of words to a smaller number of words in response to an increase in the measured speed.

8. The method of claim 7, wherein the step of displaying the billboard message includes starting the message displaying at a certain start time, the message start time being selected in response to the measured speed of the clusters, and wherein selecting the message start time includes selecting the message start time to correspond to a time when one of the clusters arrives at a distance from which the message for the billboard is readable, and selecting the message display time duration includes selecting the message display time duration to correspond to a time interval when the one of the clusters is at a distance from which the message for the billboard is readable.

* * * * *